United States Patent
Chiang et al.

(10) Patent No.: US 8,139,347 B2
(45) Date of Patent: Mar. 20, 2012

(54) TOUCH PAD MODULE ASSEMBLY STRUCTURE

(75) Inventors: Tsung-Ju Chiang, Taoyuan Shien (TW); Hsiu-Pen Lin, Zhongli (TW)

(73) Assignee: Quanta Computer Inc., Taoyuan Shien (TW)

( * ) Notice: Subject to any disclaimer, the term of this patent is extended or adjusted under 35 U.S.C. 154(b) by 97 days.

(21) Appl. No.: 12/659,335

(22) Filed: Mar. 4, 2010

(65) Prior Publication Data

US 2011/0075336 A1   Mar. 31, 2011

(30) Foreign Application Priority Data

Sep. 30, 2009   (TW) .............................. 98218076 U

(51) Int. Cl.
G06F 1/16 (2006.01)
H05K 5/00 (2006.01)
H05K 7/00 (2006.01)

(52) U.S. Cl. .............................. 361/679.18; 361/679.55

(58) Field of Classification Search .............. 361/679.01, 361/679.02, 679.18, 679.55, 679.58; 345/173
See application file for complete search history.

(56) References Cited

U.S. PATENT DOCUMENTS

| | | | | |
|---|---|---|---|---|
| 5,049,863 A * | 9/1991 | Oka | ............................... | 345/163 |
| 5,139,439 A * | 8/1992 | Shie | ............................... | 439/359 |
| 5,231,380 A * | 7/1993 | Logan | ............................... | 345/156 |
| 5,287,246 A * | 2/1994 | Sen | ............................... | 361/679.1 |
| 5,546,334 A * | 8/1996 | Hsieh et al. | ............................... | 708/141 |
| 5,793,355 A * | 8/1998 | Youens | ............................... | 345/157 |
| 6,163,326 A * | 12/2000 | Klein et al. | ............................... | 345/156 |
| 6,166,722 A * | 12/2000 | Kawabe et al. | ............... | 345/169 |
| 6,205,021 B1 * | 3/2001 | Klein et al. | ............... | 361/679.17 |
| 6,369,798 B1 * | 4/2002 | Yatsu et al. | .................... | 345/167 |
| 6,388,660 B1 * | 5/2002 | Manser et al. | ................ | 345/173 |
| 6,424,335 B1 * | 7/2002 | Kim et al. | ...................... | 345/158 |
| 6,538,880 B1 * | 3/2003 | Kamijo et al. | ............. | 361/679.4 |
| 6,628,506 B2 * | 9/2003 | Landry et al. | ............ | 361/679.27 |
| 6,859,355 B2 * | 2/2005 | Chuang et al. | ............. | 361/679.1 |
| 6,859,360 B2 * | 2/2005 | Wu et al. | .................. | 361/679.22 |
| 7,068,499 B2 * | 6/2006 | Aisenberg | ................ | 361/679.56 |
| RE40,323 E * | 5/2008 | Bae | ............................... | 345/157 |
| 7,486,279 B2 * | 2/2009 | Wong et al. | ..................... | 345/173 |
| D596,638 S * | 7/2009 | Morishita et al. | ............ | D14/439 |
| 7,880,731 B2 * | 2/2011 | Wang et al. | .................... | 345/173 |
| 2005/0116936 A1 * | 6/2005 | Chen | ............................... | 345/173 |
| 2005/0280632 A1 * | 12/2005 | Tsan | ............................... | 345/158 |
| 2006/0082553 A1 * | 4/2006 | Lin | ............................... | 345/163 |
| 2008/0096620 A1 * | 4/2008 | Lee et al. | .................. | 455/575.8 |
| 2008/0266775 A1 * | 10/2008 | Song | ............................... | 361/683 |
| 2008/0270665 A1 * | 10/2008 | Senatori et al. | ............... | 710/303 |
| 2010/0277856 A1 * | 11/2010 | Stoltz | ....................... | 361/679.06 |

* cited by examiner

*Primary Examiner* — Jinhee Lee
*Assistant Examiner* — Adrian S Wilson
(74) *Attorney, Agent, or Firm* — Rabin & Berdo, PC

(57) ABSTRACT

A touch pad module assembly structure includes a housing and a touch module. The housing includes a generally rectangular concave area, which includes a bottom surface, two housing edges, a step, a position pin and a convex member. The step is disposed closer to one of the two housing edges than the other thereof. The position pin is disposed on an inner surface of the one of the two housing edges. The convex member is disposed closer to the other of the two housing edges. The touch module includes a support member, which includes a position member and a hook member. The position member is disposed at an edge of the support member and includes a position hole to be engaged with the position pin. The hook member is disposed at an opposite edge of the support member and coupled with the other of the two housing edges.

14 Claims, 5 Drawing Sheets

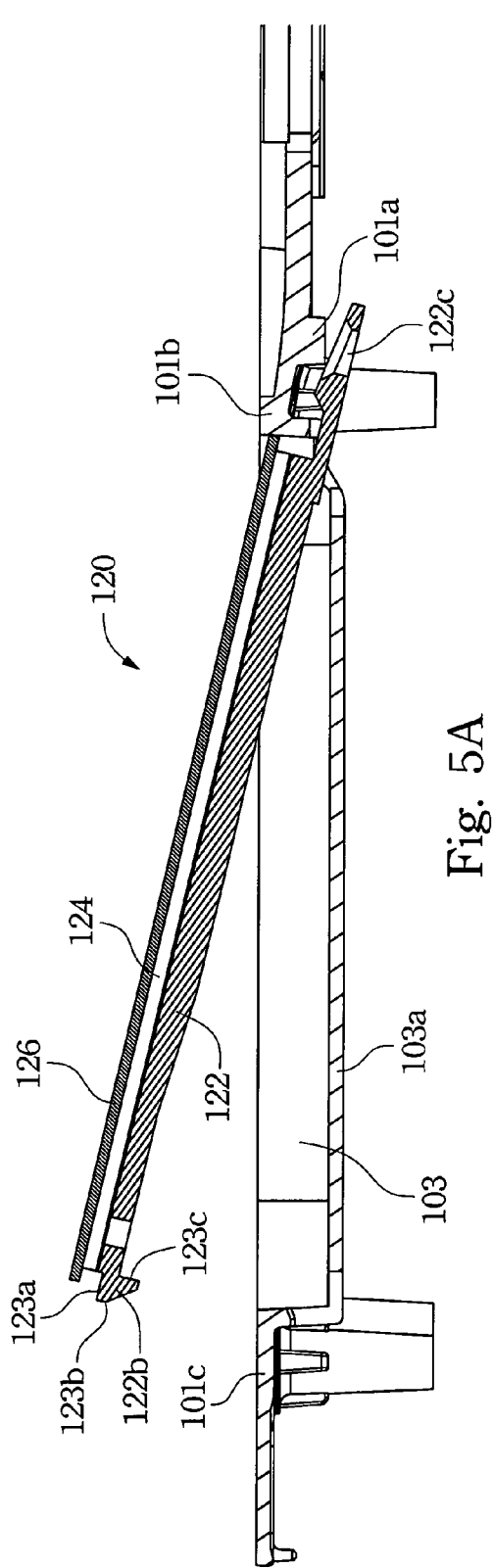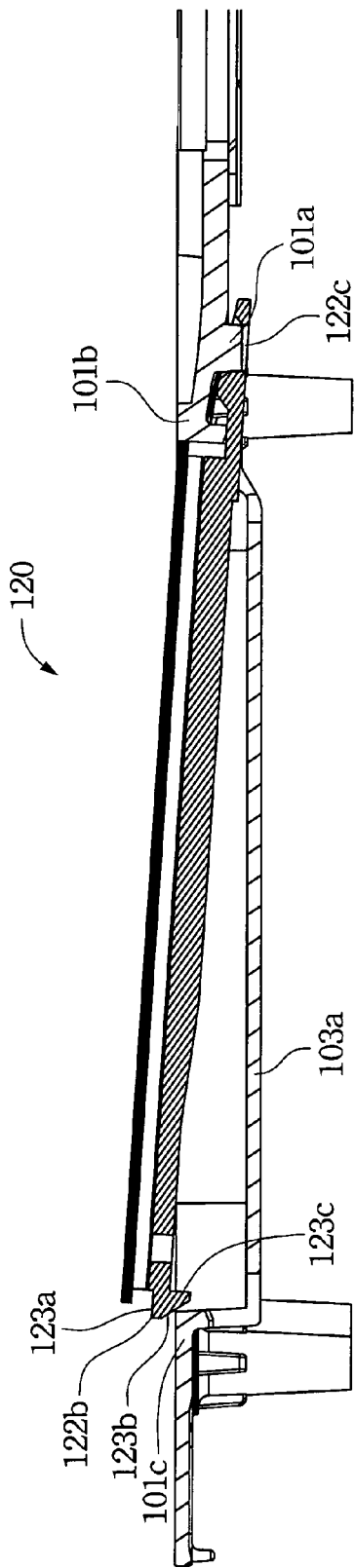
Fig. 5A
Fig. 5B

TOUCH PAD MODULE ASSEMBLY STRUCTURE

RELATED APPLICATIONS

This application claims priority to Taiwan Application Serial Number 98218076, filed Sep. 30, 2009, which is herein incorporated by reference.

BACKGROUND

1. Field of Invention

The present invention relates to a touch pad module. More particularly, the present invention relates to a touch pad module of a computer device.

2. Description of Related Art

A touch pad module is one of the essential parts of each notebook computer in order to perform a computer mouse's function within an operation system. A conventional touch pad module is assembled a computer housing by using nuts and bolts. Such assembling way would need lots of labor efforts and low production output. For the forgoing reasons, there is a need for improving the touch pad module assembly structure.

SUMMARY

It is therefore an objective of the present invention to provide an improved touch pad module assembly structure.

In accordance with the foregoing and other objectives of the present invention, a touch pad module assembly structure includes a housing and a touch module. The housing includes a generally rectangular concave area, which includes a bottom surface, two housing edges, a step, a position pin and a convex member. The two housing edges are respectively disposed at two opposite edges of the concave area. The step is disposed closer to one of the two housing edges than the other thereof. The position pin is disposed on an inner surface of the one of the two housing edges. The convex member is disposed closer to the other of the two housing edges. The touch module includes a support member, which includes a position member and a hook member. The position member is disposed at an edge of the support member and comprising a position hole to be engaged with the position pin. The hook member is disposed at an opposite edge of the support member and coupled with the other of the two housing edges.

In an embodiment of this invention, the hook member includes a generally triangular cross-section.

In another embodiment of this invention, the touch module further includes a circuit board disposed over the support member and a glass panel disposed over the circuit board.

In another embodiment of this invention, the hook member includes a first surface disposed generally in parallel with the glass panel, a second surface disposed generally perpendicular to the first surface, and a third surface interconnecting the first and second surface.

In another embodiment of this invention, when the hook member is coupled with the other of the two housing edges, an intersection of the second and third surface is in contact with the bottom surface of the concave area.

In another embodiment of this invention, when the hook member is coupled with the other of the two housing edges, the first surface is in contact with an inner surface of the other of the two housing edges.

In another embodiment of this invention, when the hook member is coupled with the other of the two housing edges, a gap is formed between the support member and the bottom surface of the concave area.

In another embodiment of this invention, when the hook member is coupled with the other of the two housing edges, the circuit board comprises a switch to be in contact with the convex member of the concave area.

In another embodiment of this invention, the support member comprises an opening to be inserted through by the switch to contact the convex member of the concave area.

In another embodiment of this invention, the edge of the support member is in contact with the step of the concave area.

In another embodiment of this invention, the support member is made from plastic materials.

In another embodiment of this invention, the housing is made from metallic materials.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 5A-5C illustrate a series of step of how the touch pad module being assembled using the cross-sectional view of FIG. 3.

DESCRIPTION OF THE PREFERRED EMBODIMENTS

Figure 1:
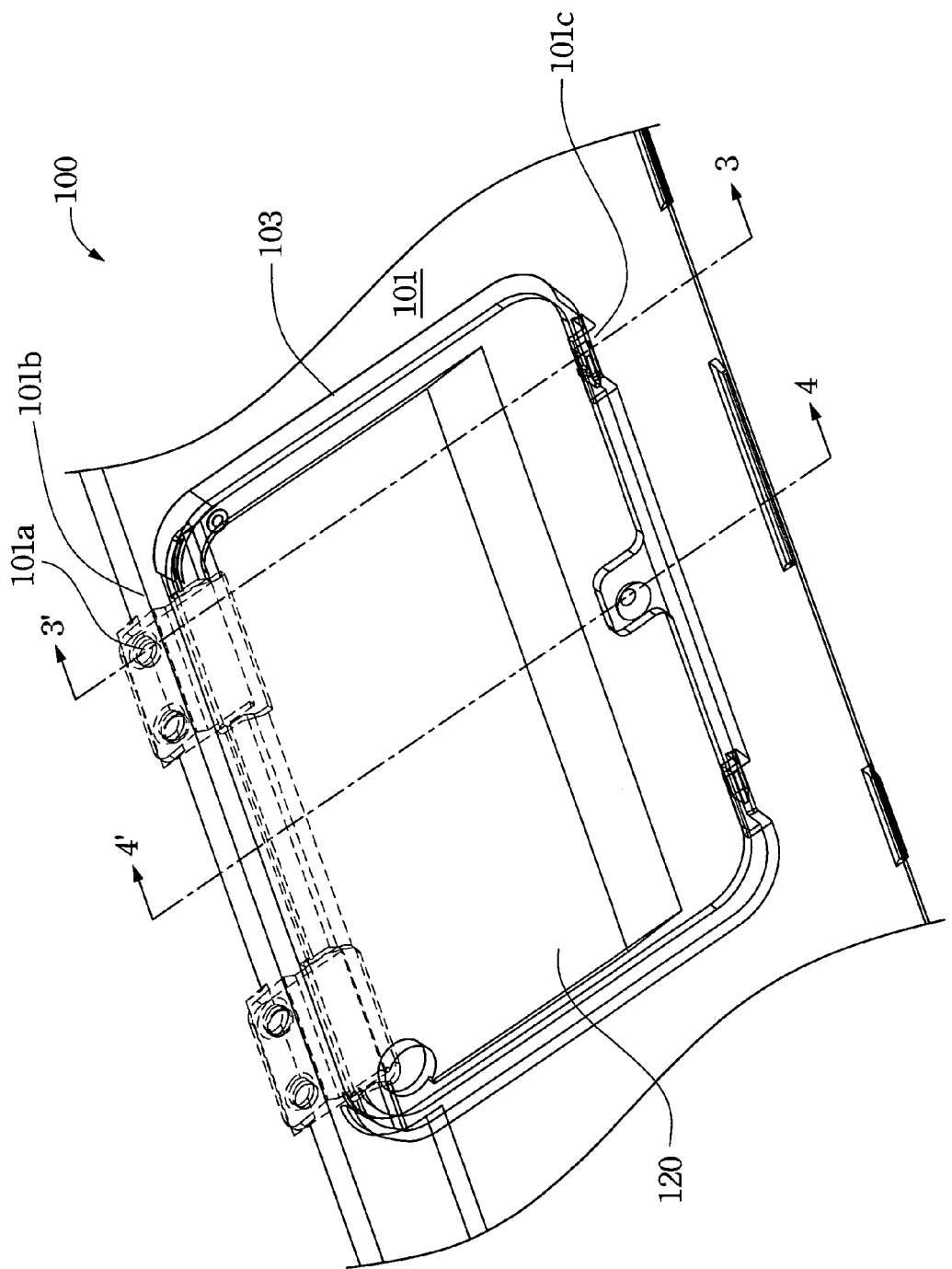
FIG. 1 illustrates a touch pad module assembly structure according to one embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
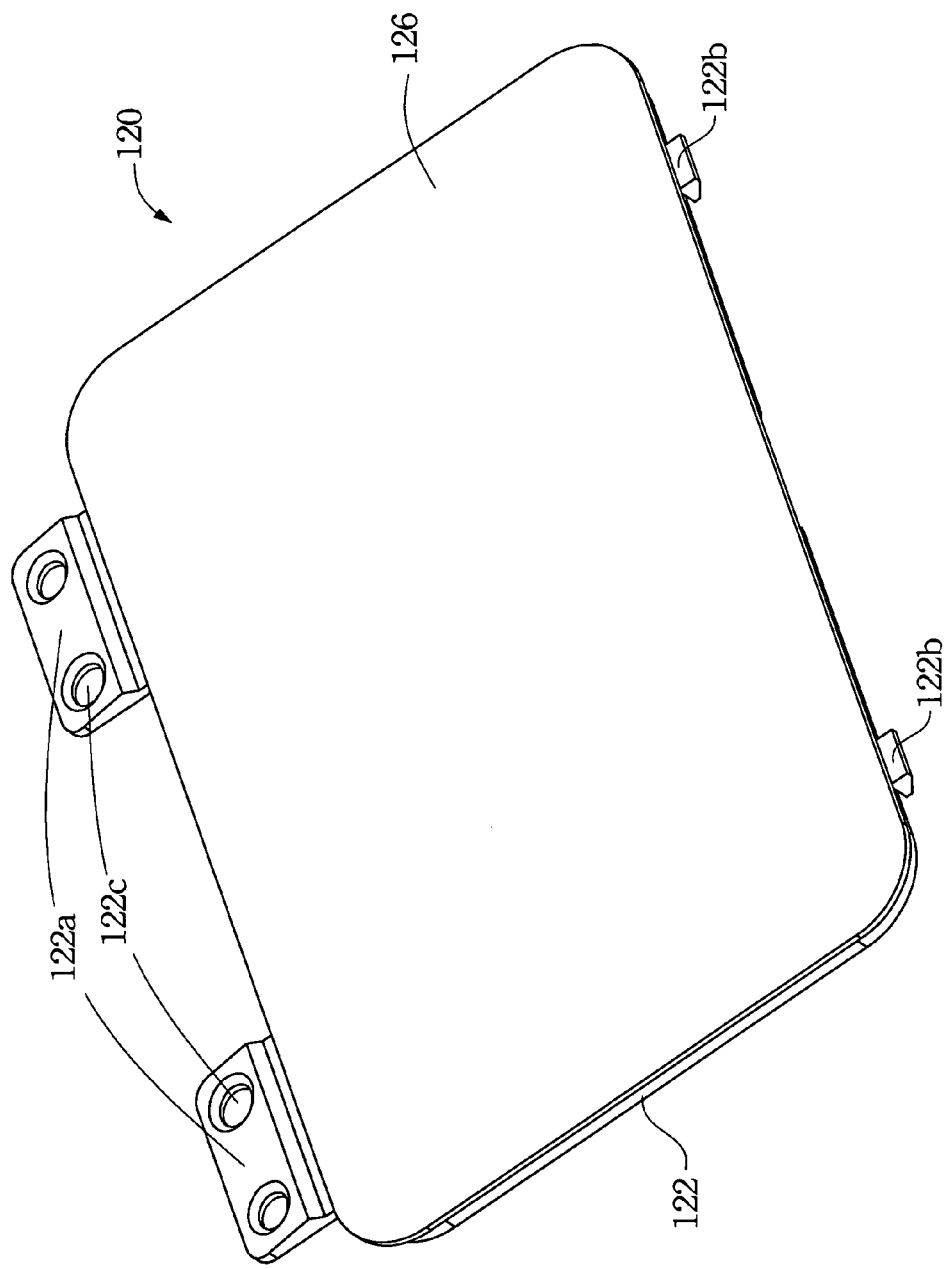
FIG. 2 illustrates the touch pad module in FIG. 1.

FIG. 1 illustrates a touch pad module assembly structure according to one embodiment of this invention. FIG. 2 illustrates the touch pad module in FIG. 1. A touch pad module 120 is assembled within a concave area 103 of a housing 101 of a computer device 100 (such as a notebook computer). The touch pad module 120 provides a cursor control function, i.e. same function as a computer does. The embodiment herein discloses a screw-less assembly method, thereby reducing labor efforts and accelerating assembly speed. The touch pad module assembly structure and assembly method is described as below.

Figure 3:
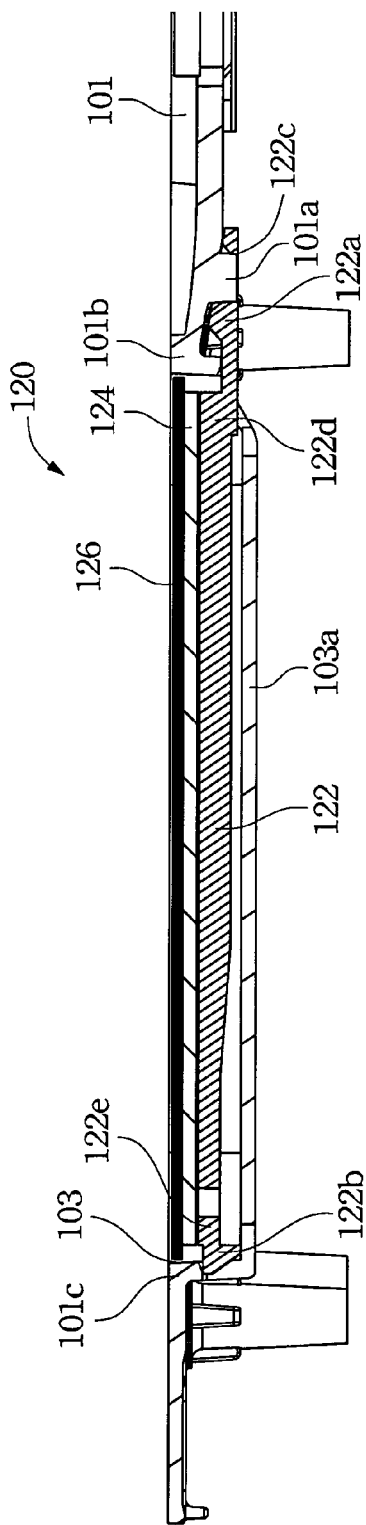
FIG. 3 illustrates a cross-sectional view taken along 3-3' in FIG. 1.

FIG. 3 illustrates a cross-sectional view taken along 3-3' in FIG. 1. The cross-section line 3-3' goes across the touch pad module 120 and two opposite housing edges (101b, 101c) of a generally rectangular concave area 103. In order to secure the touch pad module 120, a position pin 101a is located on an inner surface of the housing edge 101b for securing purpose.

The touch pad module 120 basically consists of three members: a support member 122, a circuit board 124 and a glass panel 126 (from bottom up). The circuit board 124 is attached over the support member 122, and the glass panel 126 is attached over the circuit board 124. The plastic support member 122 is to recover the circuit board 124 and glass panel 126 to an original position after they are pressed.

The support member 122 has an edge 122d with a positioning member 122a, on which a positioning hole 122c is designed, to engage with an positioning pin 101a of the housing 101. The support member 122 has an opposite edge 122e with a hook member 122b to couple with the housing edge 101c.

Figure 4:
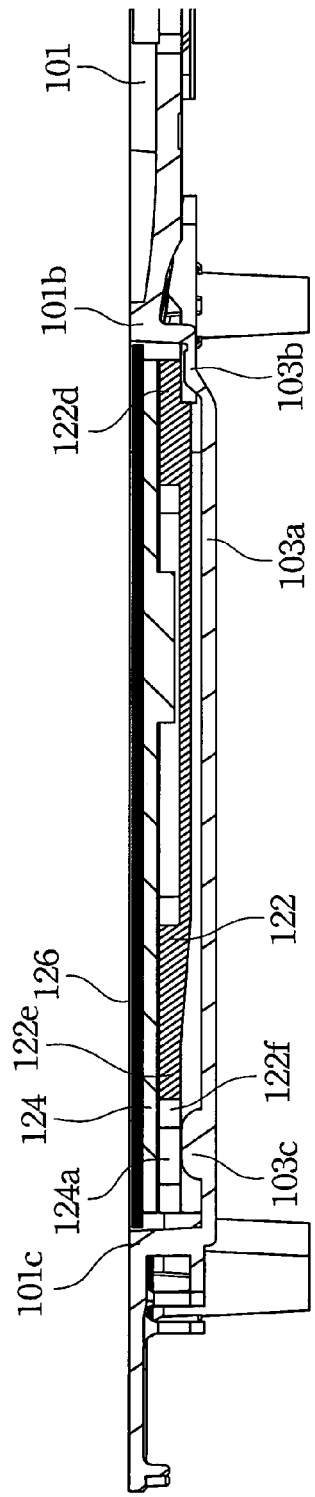
FIG. 4 illustrates a cross-sectional view taken along 4-4' in FIG. 1.

FIG. 4 illustrates a cross-sectional view taken along 4-4' in FIG. 1. The cross-section line 4-4' goes across the touch pad module 120 and two opposite housing edges (101b, 101c) of a generally rectangular concave area 103. To enable the touch pad module 120 to be elastically recoverable, a bottom surface 103a of the concave area 103 has a step 103b and a convex member 103c. The step 103b is closer to the housing edge 101b (than the housing edge 101c) and the convex member 103c is closer to the housing edge 101c (than the housing edge 101b).

The edge 122d of the support member 122 is in contact with the step 103b. The opposite edge 122e has an opening 122f to be inserted through by the switch 124a of the circuit board 124 to contact the convex member 103c of the concave area 103.

Referring both to FIG. 3 and FIG. 4, when the touch pad module 120 is assembled into the concave area 103 of the housing 101, a gap is formed between the support member 122 and the bottom surface 103a of the concave area 103 such that the support member 122 is suspended over the bottom surface 103a. The edge 122d of the support member 122 is in contact with the step 103b and has its positioning hole 122c to engage with the positioning pin 101a such that the edge 122d can be firmly secured to the housing edge 101b. The opposite edge 122e of the support member 122 has its hook member 122b to couple with the housing edge 101c and the switch 124a is in contact with the convex member 103c. When a user pushes an edge of the touch pad module 120 with the switch 124a, the support member 122 is bent to permit the switch 124a to be pushed. When the touch pad module 120 is released from push, the support member 122 recover the touch pad module 120 to an original position.

Figure 5C:
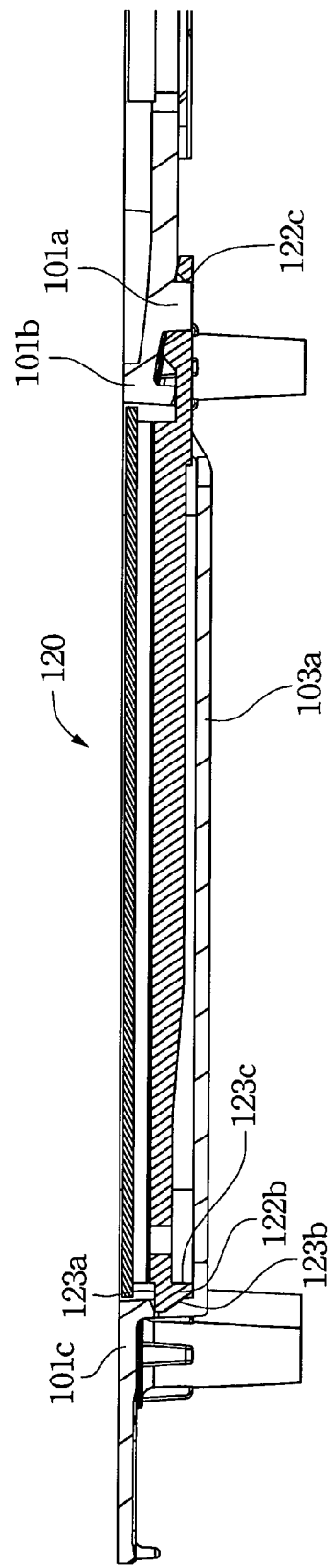

FIG. 5A-5C illustrate a series of step of how the touch pad module being assembled using the cross-sectional view of FIG. 3. An advantage of the touch pad module 120 is to permit itself assembled into the concave area 103 of the housing 101 from an appearance side thereof. Referring to FIG. 5A, an edge of the touch pad module 120 (the edge 122d of the support member 122) is inserted under the housing edge 101b, and the positioning holes 122c of the support member 122 engages with the positioning pin 101a on an inner surface of the housing 101. An opposite edge of the touch pad module 120 (the edge 122e of the support member 122) is swiveled down to couple with the housing edge 101c. The opposite edge 122e of the support member 122 has a hook member 122b with a generally triangular cross-section. The hook member 122b has three surfaces. A first surface 123a is substantially in parallel with the glass panel 126. A second surface 123c is substantially perpendicular to the first surface 123a. A third surface 123b interconnects the first surface 123a and the second surface 123c. Referring to FIG. 5B, when the hook member 122b couples with the housing edge 101c, the third surface 123b contacts the housing edge 101c such that the hook member 122b is deformed and gradually engages with the housing edge 101c. Referring to FIG. 5C, when the hook member 122b fully engages with the housing edge 101c, the first surface 123a is in contact with an inner surface of the housing edge 101c and an intersection of the second surface 123c and third surface 123b is in contact with the bottom surface 103a of the concave area 103.

In the above-discussed embodiments, the housing 101, e.g. the housing edges (101b, 101c) and the bottom surface 103a, of the computer device 100 is made from metallic materials so as to provide a stronger support for the touch pad module 120 (compared with plastic housing).

According to above-discussed embodiments, the touch pad module assembly structure permits the touch pad module to be assembled into the concave area of the housing from an appearance side thereof by a screw-less way, thereby reducing labor cost and speeding production output (compared with screw-fastening way).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch pad module assembly structure, comprising:
  a housing comprising a generally rectangular concave area, the concave area comprising:
    a bottom surface;
    a first housing edge and a second housing edge, respectively disposed at two opposite edges of the concave area;
    a step disposed on the bottom surface and closer to the first housing edge than the second housing edge;
    a position pin disposed on an inner surface of the first housing edge; and
    a convex member disposed on the bottom surface and closer to the second housing edge than the first housing edge; and
  a touch module comprising a support member,
    the support member having two opposite edges as first and second support edges, comprising:
      a position member disposed at the first support edge and comprising a position hole to be engaged with the position pin, the first support edge being in contact with the step of the concave area; and
      a hook member disposed at the second support edge and coupled with the second housing edge.

2. The touch pad module assembly structure of claim 1, wherein the hook member comprises a generally triangular cross-section.

3. The touch pad module assembly structure of claim 1, wherein the touch module further comprises:
  a circuit board disposed over the support member; and
  a glass panel disposed over the circuit board.

4. The touch pad module assembly structure of claim 3, wherein the hook member comprises:
  a first surface disposed generally in parallel with the glass panel;
  a second surface disposed generally perpendicular to the first surface; and
  a third surface interconnecting the first and second surfaces.

5. The touch pad module assembly structure of claim 4, wherein when the hook member is coupled with the second housing edge, an intersection of the second and third surfaces is in contact with the bottom surface of the concave area.

6. The touch pad module assembly structure of claim 4, wherein when the hook member is coupled with the second housing edge, the first surface is in contact with an inner surface of the second housing edge.

7. The touch pad module assembly structure of claim 1, wherein when the hook member is coupled with the second housing edge, a gap is formed between the support member and the bottom surface of the concave area.

8. The touch pad module assembly structure of claim 3, wherein when the hook member is coupled with the second housing edge, the circuit board comprises a switch to be in contact with the convex member of the concave area.

9. The touch pad module assembly structure of claim 8, wherein the support member has an opening, through which the switch is movable to contact the convex member of the concave area.

10. The touch pad module assembly structure of claim 1, wherein the support member is made from plastic materials.

11. The touch pad module assembly structure of claim 1, wherein the housing is made from metallic materials.

12. The touch pad module assembly structure of claim 8, wherein the support member is, when an edge of the touch pad module is pushed with the switch, bent to permit the switch to be pushed.

13. The touch pad module assembly structure of claim 8, wherein the support member recovers, when the switch releases from a state of pushing an edge of the touch pad, to an original position that is free of bends.

14. The touch pad module assembly structure of claim 1, wherein when the hook member is coupled with the second housing edge, the hook member is deformed and gradually engages with the second housing edge.

* * * * *